United States Patent
Arinaga et al.

(10) Patent No.: US 7,898,245 B2
(45) Date of Patent: Mar. 1, 2011

(54) MAGNETIC ENCODER

(75) Inventors: Yuji Arinaga, Kitakyushu (JP);
Katsumasa Yoshida, Kitakyushu (JP);
Koji Suzuki, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 266 days.

(21) Appl. No.: 12/300,043

(22) PCT Filed: Apr. 5, 2007

(86) PCT No.: PCT/JP2007/057677

§ 371 (c)(1),
(2), (4) Date: Nov. 7, 2008

(87) PCT Pub. No.: WO2007/132603

PCT Pub. Date: Nov. 22, 2007

(65) Prior Publication Data

US 2009/0115409 A1    May 7, 2009

(30) Foreign Application Priority Data

May 12, 2006   (JP) ............................. 2006-134032

(51) Int. Cl.
  *G01B 7/14* (2006.01)
  *G01B 7/30* (2006.01)
(52) U.S. Cl. ............................. 324/207.25; 324/207.2; 324/207.21

(58) Field of Classification Search ............ 324/207.25, 324/207.2, 207.21
See application file for complete search history.

(56) References Cited

FOREIGN PATENT DOCUMENTS

| JP | 58-162813 A | 9/1983 |
| JP | 6-164015 A | 6/1994 |
| JP | 10-300513 A | 11/1998 |
| JP | 2001-033277 A | 2/2001 |
| JP | 2002-243407 A | 8/2002 |

OTHER PUBLICATIONS

International Search Report of PCT/JP2007/057677, Mailing Date of May 15, 2007.

*Primary Examiner*—Reena Aurora
(74) *Attorney, Agent, or Firm*—Westerman, Hattori, Daniels & Adrian, LLP

(57) ABSTRACT

A high-precision magnet encoder in which high-order harmonic components can be suppressed without increasing the number of lead wires connecting magnetic field detecting elements to a signal processing circuit. Hall sensors of phase $A_1$, phase $B_1$, phase $A_2$ and phase $B_2$ are arranged sequentially around a permanent magnet 2 at intervals of 90 degrees via an air gap. Hall sensors of phase $C_1$, phase $D_1$, phase $C_2$, phase $D_2$ are arranged at positions 60 degrees away from the Hall sensors of phase $A_1$, phase $B_1$, phase $A_2$ and phase $B_2$, respectively. Connection is made between the positive output terminals of a set of Hall sensors located at positions 60 degrees away from each other and between their negative output terminals.

7 Claims, 12 Drawing Sheets

PRIOR ART

MAGNETIC ENCODER

TECHNICAL FIELD

The present invention relates to a magnetic encoder for detecting a rotational position of a servomotor for use in, e.g., a robot or a working machine.

BACKGROUND TECHNIQUE

Conventionally, there is known a position detector in which an outer periphery of a round magnet is magnetized and Hall elements are arranged so as to face the magnet via a gap at positions 90 degrees away from each other (see, e.g., Patent Document 1).

FIG. 10 is a structural view of a magnetic encoder as a first prior art.

As shown in this figure, a cylindrical magnetic body 3 is coaxially disposed around an outer periphery of a disc-shaped permanent magnet 2 attached to a shaft 11. In other words, the magnet 2 and the magnetic body 3 face each other via a gap. In this gap, Hall sensors 47 and 48 are provided at positions 90 degrees away from each other so that the Hall sensors detect the magnetic flux density changes in the gap in accordance with the rotation of the permanent magnet 2 to thereby detect the rotational position thereof.

Furthermore, conventionally, there is also known a magnetic encoder for eliminating even-order and third-order harmonic components in which a total of 6 (six) magnetic field detecting elements are arranged circumferentially at positions 60 degrees in mechanical angle away from each other around a disc-shaped permanent magnet magnetized in one direction perpendicular to the rotation axis via a gap (see, e.g., Patent Document 2).

FIG. 11 is a structural view of a magnetic encoder as a second prior art.

In this figure, "41" to "46" denote 6 (six) magnetic field detecting elements arranged at positions 60 degrees in mechanical angle away from each other at the inside of the stator 30.

The magnetic field detecting elements 41 to 46 include a total of three pairs of magnetic field detecting elements, i.e., a pair of magnetic field detecting elements 41 and 42, a pair of magnetic field detecting elements 43 and 44, and a pair of magnetic field detecting elements 45 and 46, each pair being constituted by two magnetic field detecting elements arranged at positions 180 degrees in mechanical angle away from each other.

FIG. 12 is a block diagram of a signal processing circuit of this prior art.

In this figure, "51" to "53" respectively denote a first differential amplifier. The first differential amplifier 51 calculates the differential signal of the output signal V41 of the magnetic field detecting element 41 and the output signal V42 of the magnetic field detecting element 42. The first differential amplifier 52 calculates the differential signal of the output signal V43 of the magnetic field detecting element 43 and the output signal V44 of the magnetic field detecting element 44. The first differential amplifier 53 calculates the differential signal of the output signal V45 of the magnetic field detecting element 45 and the output signal V46 of the magnetic field detecting element 46. The first differential amplifiers 51 to 53 are configured to eliminate even-order harmonic components by differentiating the output signals of the pair of magnetic field detecting elements arranged at positions 180 degrees away from each other.

"54" and "55" respectively denote a second differential amplifier which calculates the differential signal of the first differential amplifiers 51 and 52 and that of the first differential amplifiers 52 and 53. Two differential output signals from which even-order harmonic components have been eliminated are added to thereby eliminate the remaining three-order harmonic components contained in the differential output signals. The output signals Va and Vb of the second differential amplifiers 54 and 55 have a relation of a sine wave vs. a cosine wave. The angle calculation circuit 56 performs the $\tan^{-1}$ (Va/Vb) calculation of both signals to calculate the rotation angle $\theta$.

Patent Document 1: Japanese Unexamined Laid-open Patent Publication No. S58-162813
Patent Document 2: Japanese Unexamined Laid-open Patent Publication No. 2001-33277

DISCLOSURE OF THE INVENTION

Problems to be Solved by the Invention

In the magnetic encoder disclosed in the first prior art, the outer periphery of the round magnet is magnetized, and Hall elements are arranged around the magnet via a gap. In cases where the magnetic field density distribution has distortion, however, there is a problem in that the angle detection accuracy deteriorates due to the harmonic components contained in the detected signals from the Hall elements.

On the other hand, in the magnetic encoder disclosed in the second prior art, a total of six magnetic field detecting elements are arranged circumferentially at positions 60 degrees in mechanical angle away from each other so that the even-order harmonic components are cancelled by detecting the differential signals of the magnetic field detecting elements arranged at positions 180 degrees away from each other and that the third-order harmonic components are eliminated by combining the differential output signals.

However, there are the following drawbacks. The number of magnetic field detecting elements increases from four (4) to six (6), which increases the number of lead wires for connecting the magnetic field detecting elements to the signal processing circuits. This, in turn, results in deteriorated reliability and workability. Furthermore, odd-order harmonic components exceeding third-order harmonic components cannot be eliminated, and therefore there is an accuracy limit.

The present invention was made in view of the aforementioned problems, and aims to provide a high-precision magnetic encoder capable of suppressing higher-order harmonic components without increasing the number of lead wires connecting magnetic field detecting elements to a signal processing circuit.

Means to Solve the Problems

In order to solve the aforementioned problems, the present invention is constituted as follows.

In a first aspect of the invention, a magnetic encoder equipped with a disc-shaped or ring-shaped permanent magnet attached to a rotor and magnetized in one direction perpendicular to an axial direction of the rotor, a magnetic field detecting element attached to a stator so as to face the permanent magnet via a gap, and a signal processing circuit for processing a signal from the magnetic field detecting element, characterized in that the magnetic field detecting element comprises Hall sensors of phase $A_1$, phase $B_1$, phase $A_2$ and phase $B_2$ sequentially arranged at intervals of 90 degrees and Hall sensors of phase $C_1$, phase $D_1$, phase $C_2$ and phase $D_2$ arranged at positions $\alpha=360/N$ or $\alpha=180/N$ (N is an odd number of 3 or above) away from the Hall sensors of phase $A_1$, phase $B_1$, phase $A_2$ and phase $B_2$, and output terminals of the Hall sensors of phase $A_1$, phase $B_1$, phase $A_2$ and phase $B_2$ and output terminals of Hall sensors of phase $C_1$, phase $D_1$, phase $C_2$ and phase $D_2$ are connected in parallel, respectively.

In a second aspect of the invention, a magnetic encoder equipped with a disc-shaped or ring-shaped permanent magnet attached to a rotor and magnetized in one direction perpendicular to an axial direction of the rotor, a magnetic field detecting element attached to a stator so as to face the permanent magnet via a gap, and a signal processing circuit for processing a signal from the magnetic field detecting element, characterized in that the magnetic field detecting element comprises Hall sensors of phase $A_1$, phase $B_1$, phase $A_2$ and phase $B_2$ sequentially arranged at intervals of 90 degrees and Hall sensors of phase $C_1$, phase $D_1$, phase $C_2$ and phase $D_2$ arranged at positions $\alpha=360/N$ or $\alpha=180/N$ (N is an odd number of 3 or above) away from the Hall sensors of phase $A_1$, phase $B_1$, phase $A_2$ and phase $B_2$, and output terminals of the Hall sensors of phase $A_1$, phase $B_1$, phase $A_2$ and phase $B_2$ and output terminals of Hall sensors of phase $C_1$, phase $D_1$, phase $C_2$ and phase $D_2$ are connected in series, respectively.

In a third aspect of the invention is characterized in that the N is 3.

In a fourth aspect of the invention is characterized in that the N is 5.

In a fifth aspect of the invention, a magnetic encoder equipped with a disc-shaped or ring-shaped permanent magnet attached to a rotor and magnetized in one direction perpendicular to an axial direction of the rotor, a magnetic field detecting element attached to a stator so as to face the permanent magnet via a gap, and a signal processing circuit for processing a signal from the magnetic field detecting element, characterized in that the magnetic field detecting element comprises Hall sensors of phase $A_1$, phase $B_1$, phase $A_2$ and phase $B_2$ sequentially arranged at intervals of 90 degrees and Hall sensors of phase $C_1$, phase $D_1$, phase $C_2$ and phase $D_2$ arranged at positions $\alpha_1=360/N_1$ or $\alpha_1=180/N_1$ ($N_1$ is an odd number of 3 or above) away from the Hall sensors of phase $A_1$, phase $B_1$, phase $A_2$ and phase $B_2$, and Hall sensors of phase $E_1$, phase $F_1$, phase $E_2$ and phase $F_2$ arranged at positions $\alpha_2=360/N_2$ or $\alpha_2=180/N_2$ ($N_2$ is an odd number of 3 or above and different from the $N_1$) away from the Hall sensors of phase $A_1$, phase $B_1$, phase $A_2$ and phase $B_2$, and output terminals of the Hall sensors of $A_1$, phase $B_1$, phase $A_2$ and phase $B_2$, output terminals of Hall sensors of phase $C_1$, phase $D_1$, phase $C_2$ and phase $D_2$ and output terminals of Hall sensors of phase $E_1$, phase $F_1$, phase $E_2$ and phase $F_2$ are connected in parallel, respectively.

In a sixth aspect of the invention, a magnetic encoder equipped with a disc-shaped or ring-shaped permanent magnet attached to a rotor and magnetized in one direction perpendicular to an axial direction of the rotor, a magnetic field detecting element attached to a stator so as to face the permanent magnet via a gap, and a signal processing circuit for processing a signal from the magnetic field detecting element, characterized in that the magnetic field detecting element comprises Hall sensors of phase $A_1$, phase $B_1$, phase $A_2$ and phase $B_2$ sequentially arranged at intervals of 90 degrees and Hall sensors of phase $C_1$, phase $D_1$, phase $C_2$ and phase $D_2$ arranged at positions $\alpha_1=360/N_1$ or $\alpha_1=180/N_1$ ($N_1$ is an odd number of 3 or above) away from the Hall sensors of phase $A_1$, phase $B_1$, phase $A_2$ and phase $B_2$, and Hall sensors of phase $E_1$, phase $F_1$, phase $E_2$ and phase $F_2$ arranged at positions $\alpha_2=360/N_2$ or $\alpha_2=180/N_2$ ($N_2$ is an odd number of 3 or above and different from the $N_1$) away from the Hall sensors of phase $A_1$, phase $B_1$, phase $A_2$ and phase $B_2$, and output terminals of the Hall sensors of phase $A_1$, phase $B_1$, phase $A_2$ and phase $B_2$, output terminals of Hall sensors of phase $C_1$, phase $D_1$, phase $C_2$ and phase $D_2$ and output terminals of Hall sensors of phase $E_1$, phase $F_1$, phase $E_2$ and phase $F_2$ are connected in series, respectively.

In a seventh aspect of the invention is characterized in that $N_1$ is 3 and $N_2$ is 5.

EFFECTS OF THE INVENTION

In the first aspect of the invention, since the Hall elements are arranged at positions 360/N or 180/N away from the four Hall elements arranged sequentially at intervals of 90 degrees and the Hall elements are connected in parallel, the N-order harmonic components can be suppressed. Furthermore, since the output terminals of the Hall elements are connected in parallel, the number of lead wires for output signals is not increased. Accordingly, without increasing the number of lead wires to a signal processing circuit, a high-precision magnetic encoder can be provided.

In the second aspect of the invention, since the Hall elements are arranged at positions 360/N or 180/N away from the four Hall elements arranged sequentially at intervals of 90 degrees and the Hall elements are connected in series, the N-order harmonic components can be suppressed and the fundamental wave component signal is amplified, and therefore the S/N ratio of the output signal can be improved. Furthermore, since the output terminals of the Hall elements are connected in series, the number of lead wires for output signals is not increased. Accordingly, without increasing the number of lead wires to a signal processing circuit, a high-precision magnetic encoder can be provided.

In the fifth aspect of the invention, since the Hall elements are arranged at positions $360/N_1$ or $180/N_1$ away from the four Hall elements arranged sequentially at intervals of 90 degrees and the Hall elements are connected in parallel, the $N_1$-order and $N_2$-order harmonic components can be eliminated, and the fundamental wave component signal is amplified, and therefore the S/N ratio of the output signal can be improved. Furthermore, since the output terminals of the Hall elements are connected in parallel, the number of lead wires for output signals is not increased. Accordingly, without increasing the number of lead wires to a signal processing circuit, a high-precision magnetic encoder can be provided.

In the sixth aspect of the invention, since the Hall elements are arranged at positions $360/N_1$ or $180/N_1$ away from the four Hall elements arranged sequentially at intervals of 90 degrees and the Hall elements are connected in series, the $N_1$-order or $N_2$-order harmonic components can be eliminated and the fundamental wave component signal is amplified, and therefore the S/N ratio of the output signal can be improved. Furthermore, since the output terminals of the Hall elements are connected in series, the number of lead wires for output signals is not increased. Accordingly, without increasing the number of lead wires to a signal processing circuit, a high-precision magnetic encoder can be provided.

Figure 1:
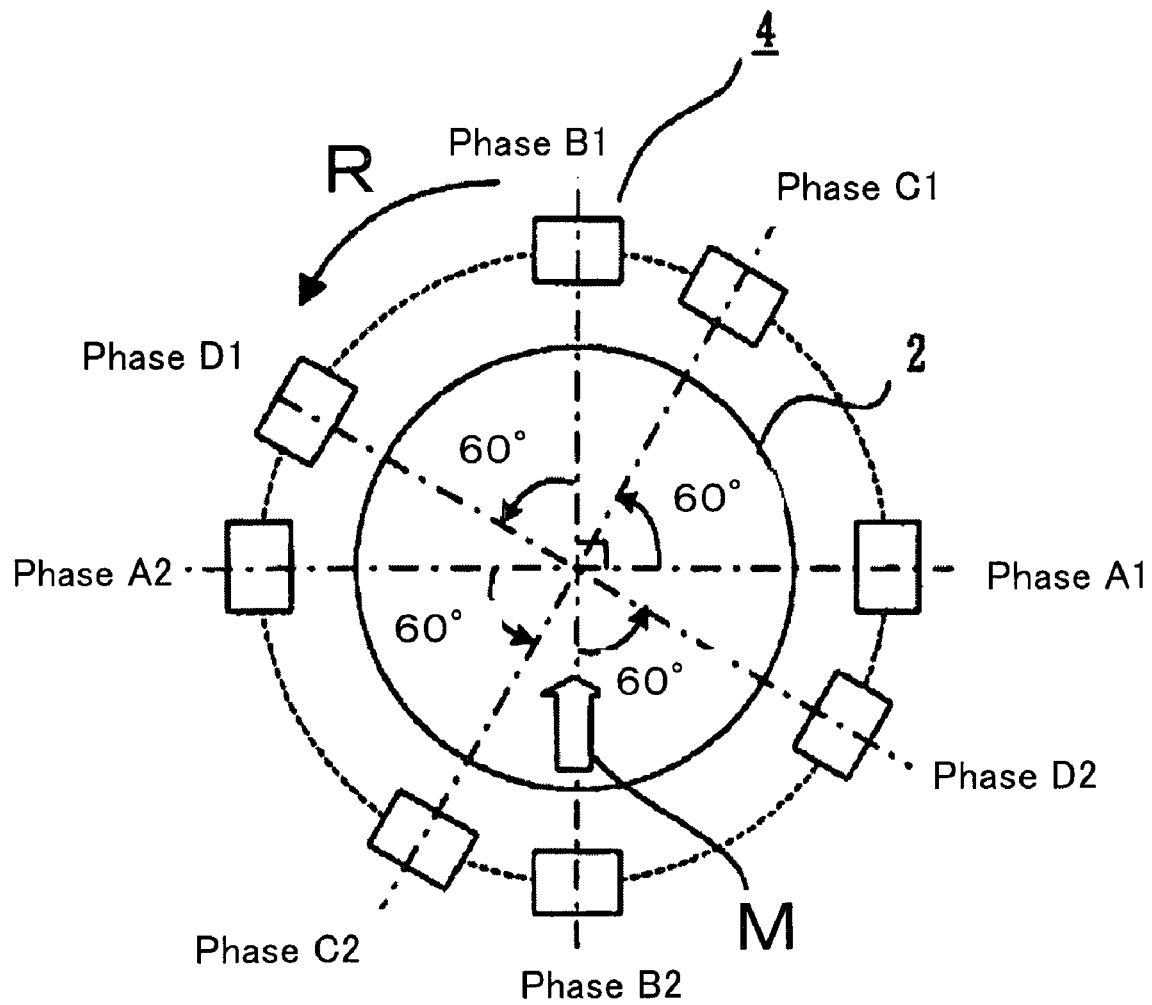
FIG. 1 is a structural view of a position signal detecting portion of a magnetic encoder according to a first embodiment of the present invention.

DESCRIPTION OF REFERENCE NUMERALS 1 rotor
11 shaft (rotary shaft)
2 permanent magnet
21 ring-shaped permanent magnet
3 magnetic material
30 stator
4, 47, 48 Hall sensor
40 position signal detecting portion
41-46 magnetic field detecting element
50, 80 signal processing circuit
51-53 first differential amplifier
54, 55 second differential amplifier
56, 87 angle calculation circuit
70 position signal detecting portion
81-86 differential amplifier
9 power source

BEST MODE FOR CARRYING OUT THE INVENTION

Hereinafter, embodiments of the present invention will be explained with reference to the drawings.

Embodiment 1

FIG. 1 is a structural view of a position signal detecting portion of a magnetic encoder of a first embodiment of the present invention.

In this figure, "2" denotes a permanent magnet attached to a rotor (not illustrated). This permanent magnet is magnetized in one direction perpendicular to the axial direction of the rotor as shown in the arrow M in this figure. The arrow R shows a rotation direction. "4" denotes a Hall sensor for detecting the magnetic field of the permanent magnet 2 and converting it into a voltage.

The Hall sensor 4 consists of a total of eight (8) Hall sensors, i.e., Hall sensors of phase $A_1$, phase $B_1$, phase $A_2$ and phase $B_2$ arranged sequentially around the permanent magnet 2 at intervals of 90 degrees via a gap, and Hall sensors of phase $C_1$, phase $D_1$, phase $C_2$ and phase $D_2$ arranged at positions respectively 60 degrees (corresponding to the case in which $\alpha=180/N$, $N=3$) away from the Hall sensors of phase $A_1$, phase $B_1$, phase $A_2$ and phase $B_2$.

Figure 2:
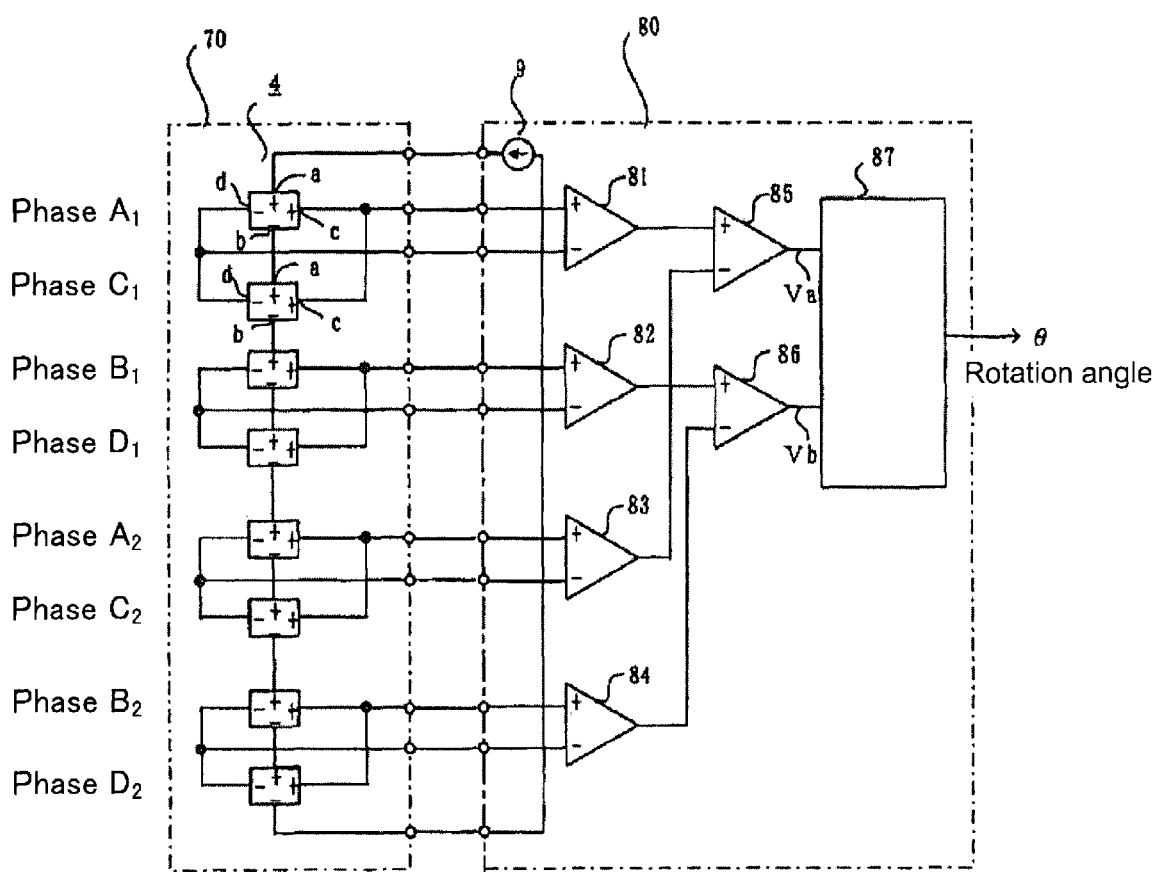
FIG. 2 is a connection diagram of Hall sensors of the magnetic encoder according to the first embodiment of the present invention.

FIG. 2 is a connection diagram of the Hall sensors of the magnetic encoder of this embodiment. In this figure, "70" denotes a position signal detecting portion including eight Hall sensors. "a" denotes a positive input terminal of the Hall sensor 4, "b" denotes a negative input terminal thereof, "c" denotes a positive output terminal, and "d" denotes a negative output terminal. The eight Hall sensors are connected in series at the input side and powered by the power source 9 disposed in the signal processing circuit 80.

As to the output side, a pair of Hall sensors arranged at positions 60 degrees away from each other are connected in parallel so that the positive output terminals are connected with each other and the negative output terminals are connected with each other. In detail, as to the Hall sensor of phase $A_1$ and the Hall sensor of $C_1$, the positive output terminal c of the Hall sensor of phase $A_1$ and the positive output terminal c of the Hall sensor of phase $C_1$ are connected, and the negative output terminal d of the Hall sensor of phase $A_1$ and the negative output terminal d of the Hall sensor of phase $C_1$ are connected. As to the pair of the Hall sensor of phase $B_1$ and the Hall sensor of phase $D_1$, the pair of the Hall sensor of phase $A_2$ and the Hall sensor of phase $C_2$, and the pair of the Hall sensor of phase $B_2$ and the Hall sensor of phase $D_2$, they are connected in the same manner as mentioned above.

The present invention is different from the prior art in that the Hall sensor of phase $C_1$, the Hall sensor of phase $D_1$, the Hall sensor of phase $C_2$ and the Hall sensor of phase $D_2$ are arranged at positions respectively 60 degrees away from the Hall sensor of phase $A_1$, the Hall sensor of phase $B_1$, the Hall sensor of phase $A_2$ and the Hall sensor of $B_2$ arranged sequentially at intervals of 90 degrees and that the output terminals of the Hall sensor of phase $A_1$, the output terminals of the Hall sensor of phase $B_1$, the output terminals of the Hall sensor of phase $A_2$ and the output terminals of the Hall sensor of phase $B_2$ are connected to the output terminals of the Hall sensor of phase $C_1$, the output terminals of the Hall sensor of phase $D_1$, the output terminals of the Hall sensor of phase $C_2$, and the output terminals of the Hall sensor of phase $D_2$, in parallel, respectively.

The connections are made at the position signal detecting portion 70 shown in FIG. 2. The required number of lead wires from the position signal detecting portion 70 to the signal processing circuit 80 is normally the number of sensors×2 for the signal lines plus two for the power lines. In the case of using six Hall sensors as in the second prior art, a total of 14 lines (6×2+2=14) is required. In this embodiment, however, the number can be reduced to 10.

Next, the operation will be explained.

When the permanent magnet 2 rotates, each Hall sensor 4 detects the magnetic field changes and outputs a sine wave signal of one cycle per rotation. In practice, the output signal from each Hall sensor includes even-order and odd-order harmonic components in addition to a fundamental wave signal of one cycle per one rotation. In this embodiment, it will be explained that third-order and even-order harmonic components can be suppressed.

Figure 3:
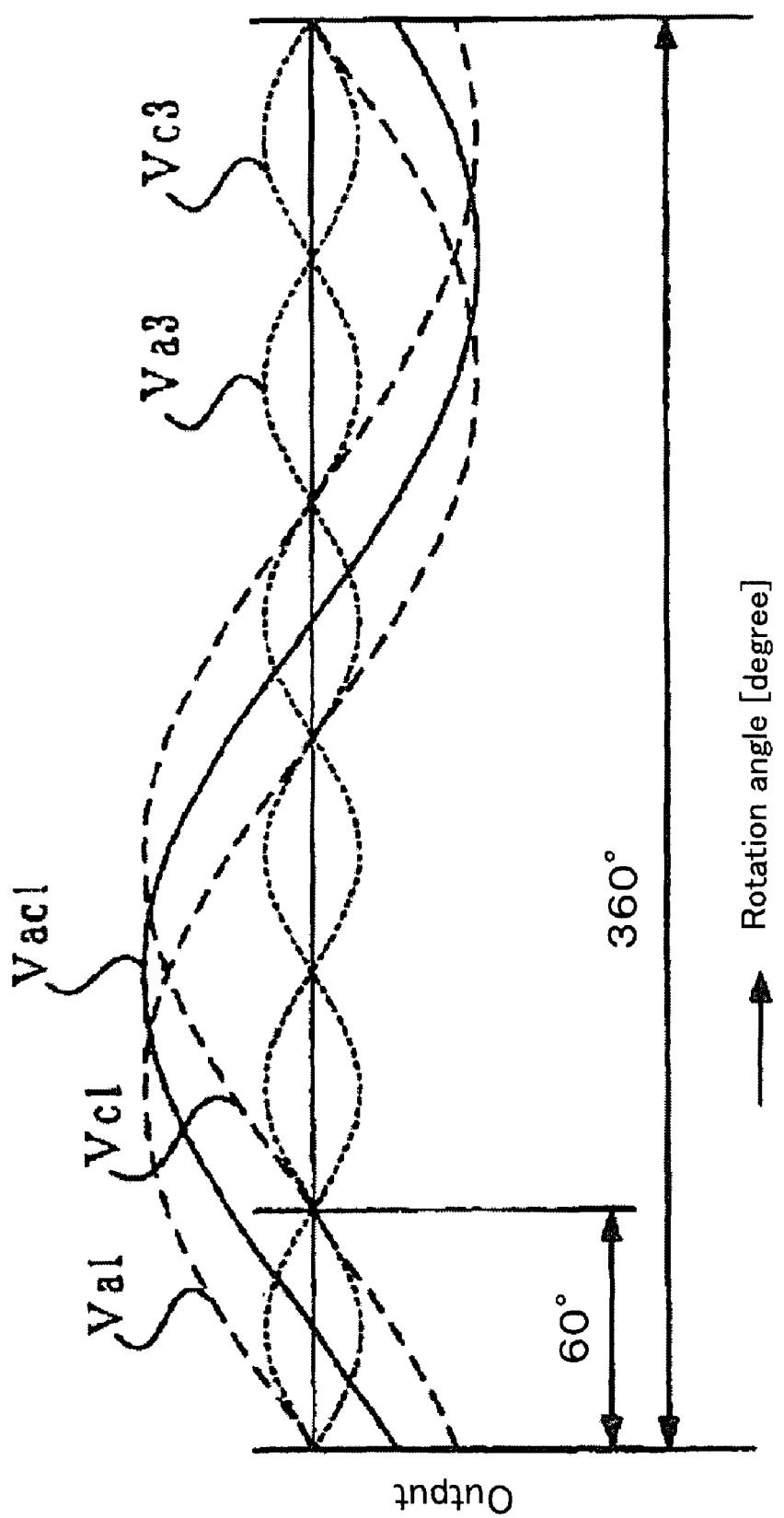
FIG. 3 is a graph showing a detection principle of the magnetic encoder according to the first embodiment of the present invention.

FIG. 3 is a graph showing a detection principle in this embodiment.

In this figure, "Va1" denotes a fundamental wave output signal from the Hall sensor of phase $A_1$, "Vc1" denotes a fundamental wave output signal from the Hall sensor of phase $C_1$, "Va3" denotes a third-order harmonic signal included in the output signal from the Hall sensor of phase $A_1$, "Vc3" denotes a third-order harmonic signal included in the output signal from the Hall sensor of phase $C_1$, and "Vac1" denotes an output signal obtained when the output terminals of the Hall sensors of phase $A_1$ and phase $C_1$ are connected in parallel.

In this embodiment, in the position signal detecting portion 70, the Hall sensors of phase $A_1$ and phase $C_1$ are disposed at positions 60 degrees in mechanical angle away from each other and connected in parallel. Therefore, the third-order harmonic components contained in the output signals of the Hall sensors of phase $A_1$ and phase $C_1$ have a phase difference of 180 degrees in electric angle, and thus the third-order harmonic components are cancelled. That is, a signal small in third-order harmonic components can be obtained from between the output terminals (output terminals c and d) connected in parallel.

In the same manner, in the Hall sensors of phase $B_1$ and phase $D_1$, the Hall sensors of phase $A_2$ and phase $C_2$, and the Hall sensors of phase $B_2$ and $D_2$, a signal small in third-order harmonic components can be obtained from between the respective output terminals connected in parallel.

The output signals from four pairs of Hall sensors connected in parallel are amplified respectively by the differential amplifiers 81 to 84. Thereafter, the output signals from the differential amplifiers 81 and 83 are amplified differentially by the differential amplifier 85, and the output signals from the differential amplifiers 82 and 84 are amplified differentially by the differential amplifier 86. The output signals from the differential amplifiers 81 and 83 and the output signals from the differential amplifiers 82 and 84 are output signals from the pair of Hall sensors positioned 180 degrees away from each other, respectively. Therefore, the differential amplification thereof eliminates the even-order harmonic compositions.

The output signal Va from the differential amplifier 85 and the output signal Vb from the differential amplifier 86 are inputted into the angle conversion circuit 87. The output signals Va and Vb are sine-wave signals different in phase by 90 degrees, and converted into an angle signal θ by the $\tan^{-1}$ (Va/Vb) calculation.

As explained above, in this embodiment, the output terminals of the Hall sensors arranged at positions 60 degrees away from each other are connected in parallel in the position signal detecting portion, and the output signals from the pair of the Hall sensors arranged at positions 180 degrees away from each other are differentially amplified in the signal processing circuit, and therefore the third-order and even-order harmonic components will be suppressed. Accordingly, a high-precision angle signal can be obtained with a smaller number of lead wires.

Embodiment 2

Figure 4:
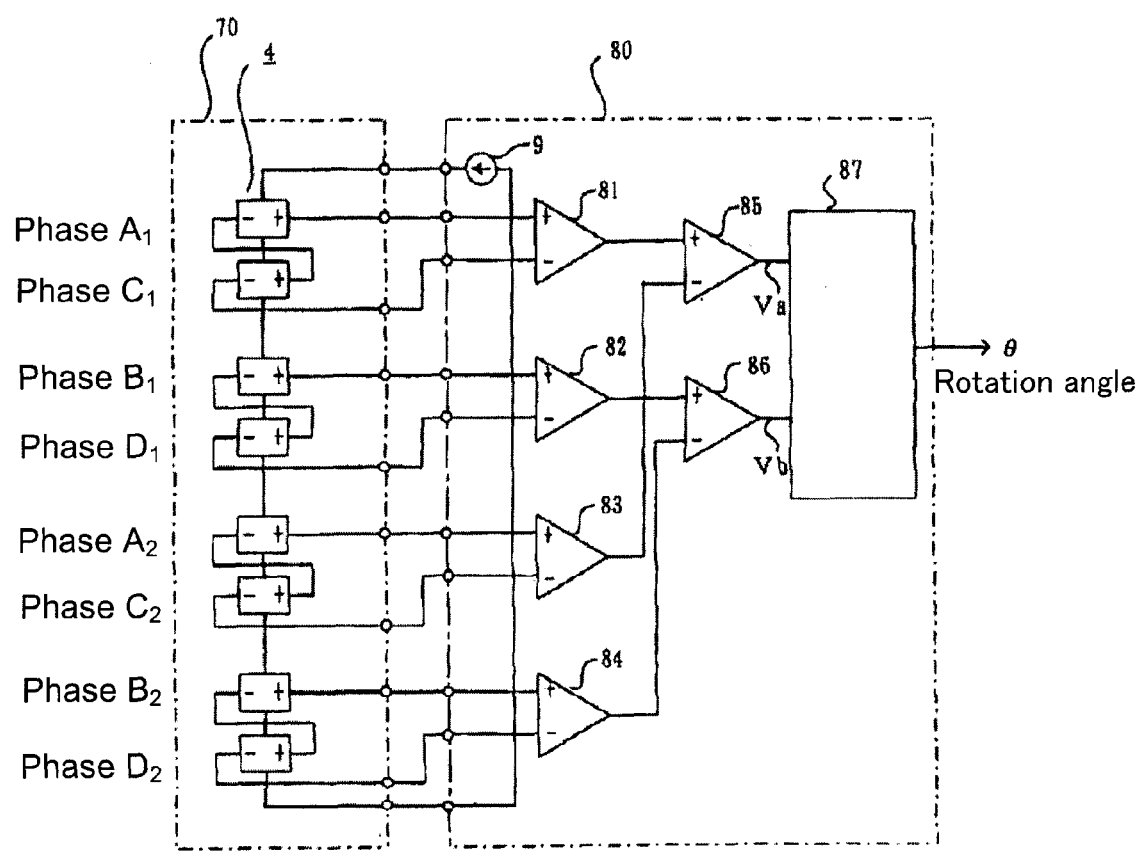
FIG. 4 is a connection diagram of Hall sensors of a magnetic encoder according to a second embodiment of the present invention.

FIG. 4 is a connection diagram of Hall sensors of a magnetic encoder according to a second embodiment of the present invention. The arrangement of the Hall sensors is the same as in the embodiment shown in FIG. 1.

This embodiment is different from the first embodiment in that the output terminals of a pair of Hall sensors arranged at positions 60 degrees away from each other are connected in series.

Figure 5:
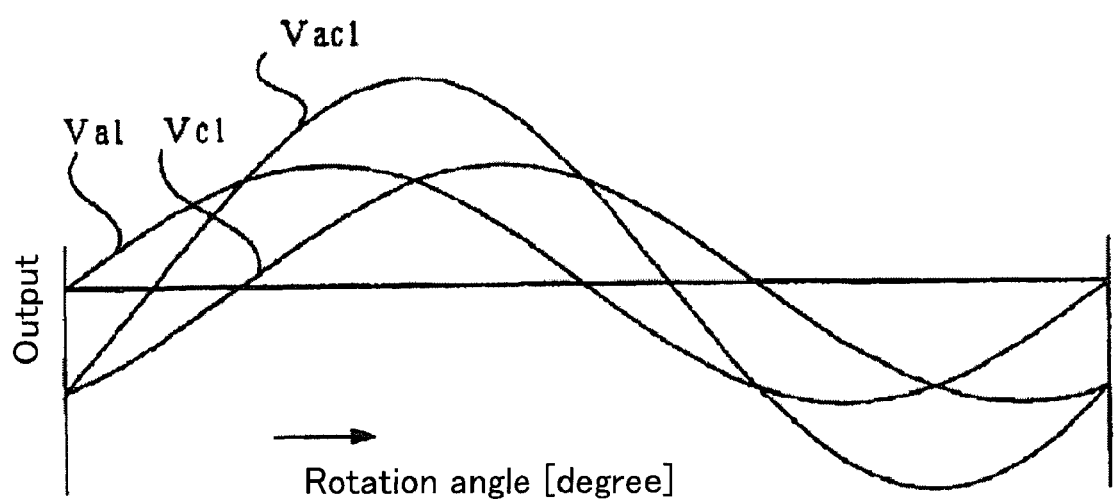
FIG. 5 is a graph showing a detection principle of the magnetic encoder according to the second embodiment of the present invention.

FIG. 5 is a graph showing a detection principle in this embodiment.

In this figure, "Va1" denotes a fundamental wave output signal from the Hall sensor of phase $A_1$, "Vc1" denotes a fundamental wave output signal from the Hall sensor of phase $C_1$, "Vac1" denotes an output signal obtained when the output terminals of the Hall sensors of phase $A_1$ and phase $C_1$ are connected in series. The output signal Vac1 will be a signal in which the signal Va1 and the signal Vc1 are vectorially synthesized, and is about 1.7 times larger than the signals Va1 and Vc1.

It is apparent that the third-order harmonic components will be cancelled and a signal small in third-order harmonic components can be obtained in the same manner as in the first embodiment.

Although not illustrated, also in the Hall sensors of phase $B_1$ and $D_1$, the Hall sensors of phase $A_2$ and $C_2$, and the Hall sensors of phase $B_2$ and $D_2$, a fundamental wave output signal about 1.7 times in amplitude with less third-order harmonic components can be obtained from between respective output terminals connected in series.

As will be apparent from the above, in this embodiment, the third-order harmonic components will be cancelled and a signal about 1.7 times larger than the differential signal of a single Hall sensor can be obtained. Therefore, a signal excellent in S/N ratio can be obtained.

Embodiment 3

Figure 6:
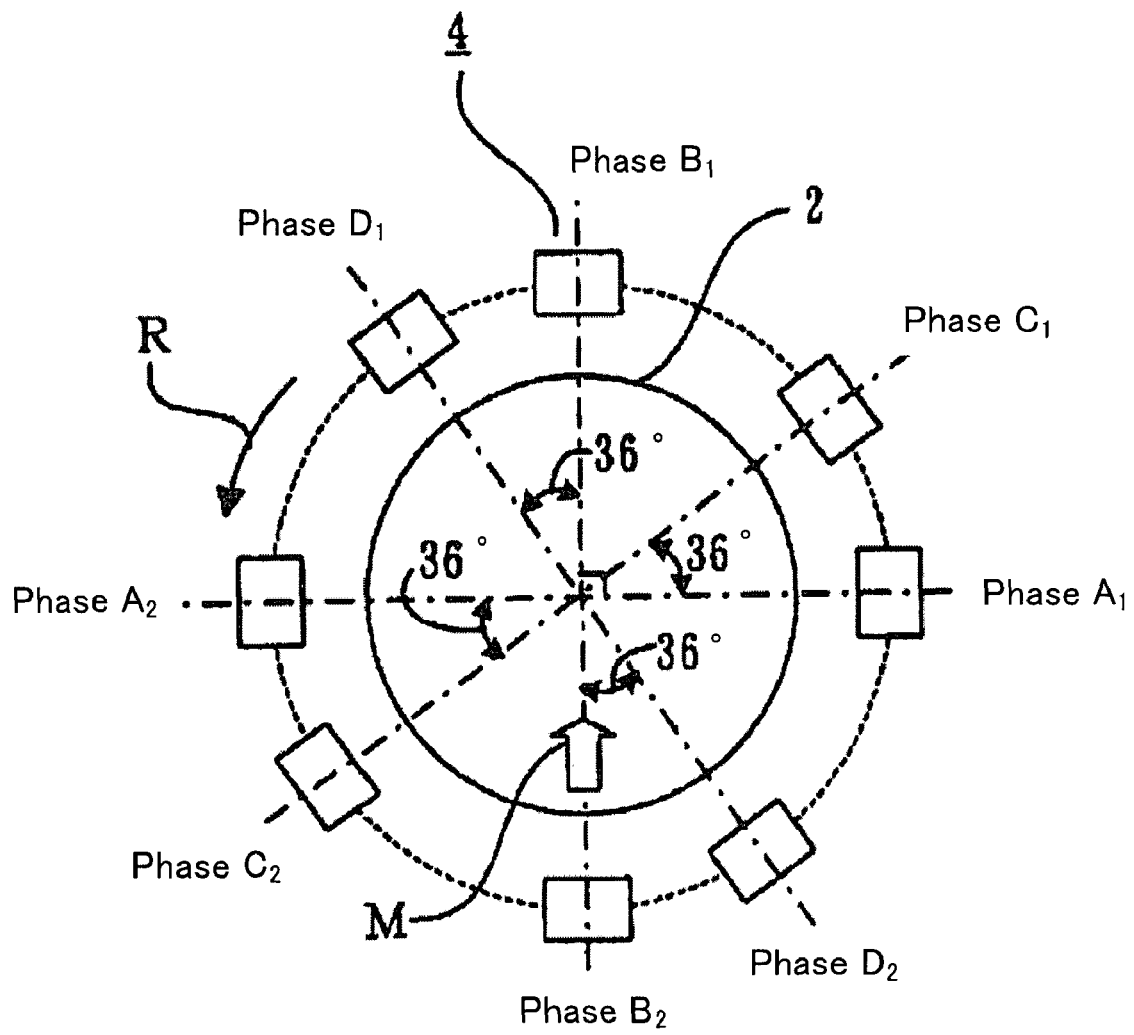
FIG. 6 is a structural view of a position signal detecting portion of a magnetic encoder according to a third embodiment of the present invention.

FIG. 6 is a structural view of a position signal detecting portion of a magnetic encoder according to a third embodiment of the present invention.

In this figure, "2" denotes a permanent magnet attached to a rotor (not illustrated). The permanent magnet is magnetized in one direction perpendicular to the axial direction of the rotor as shown in the arrow M in this figure. "4" denotes a Hall sensor for detecting the magnetic field of the permanent magnet 2 and converting it into a voltage.

The Hall sensor 4 includes a total of eight Hall sensors, i.e., Hall sensors of phase $A_1$, phase $B_1$, phase $A_2$ and phase $B_2$ arranged sequentially 2 around the permanent magnet 2 via a gap at intervals of 90 degrees, Hall sensors of phase $C_1$, phase $D_1$, phase $C_2$ and phase $D_2$ arranged at positions respectively 36 degrees (corresponding to the case in which α=180/N, N=5) away from the Hall sensors of phase $A_1$, phase $B_1$, phase $A_2$ and phase $B_2$.

This embodiment is different from the first embodiment in that the Hall sensors of phase $C_1$, phase $D_1$, phase $C_2$ and phase $D_2$ are arranged at positions respectively 36 degrees away from the Hall sensors of phase $A_1$, phase $B_1$, phase $A_2$ and phase $B_2$.

The connection of the Hall sensors in the position signal detecting portion and the connection to the signal processing circuit are the same as in the embodiment shown in FIG. 2.

In this embodiment, the Hall sensors forming a group are arranged at positions 36 degrees in mechanical angle away from the Hall sensors forming another group, and the output terminals of both groups are connected in parallel. Therefore, the fifth-order harmonic components contained in the output signal from one of the groups and those contained in the output signal from the other group have a phase difference of 180 degrees in electric angle, and therefore the fifth-order harmonic components will be cancelled. In other words, a signal small in fifth-order harmonic components can be obtained from between the output terminals (between the terminals c and d) connected in parallel.

In this embodiment, the output terminals of Hall sensors forming each group are connected in parallel. However, by connecting them in series, the output signals from the Hall sensors forming each group will be vectrorially synthesized. The result is a signal having a fundamental wave about 1.9 times larger than that of a signal from a single Hall sensor.

If it is a requirement to eliminate the seventh-order or above harmonic components, such elimination can be performed by: arranging four Hall sensors of phase $A_1$, phase $B_1$, phase $A_2$ and phase $B_2$; arranging Hall sensors of phase $C_1$, phase $D_1$, phase $C_2$ and phase $D_2$ at positions respectively $\alpha_1$ degree or $\alpha_2$ degree away from the Hall sensors of phase $A_1$, phase $B_1$, phase $A_2$ and phase $B_2$, where $\alpha_1$=360/N or $\alpha_2$=180/N, N is an integer of 7 or above; and connecting the output terminals of the Hall sensors consisting each group so that the harmonic components of the signal from one group and those of the signal from the other group have a phase difference of 180 degrees in electric angle.

Embodiment 4

Figure 7:
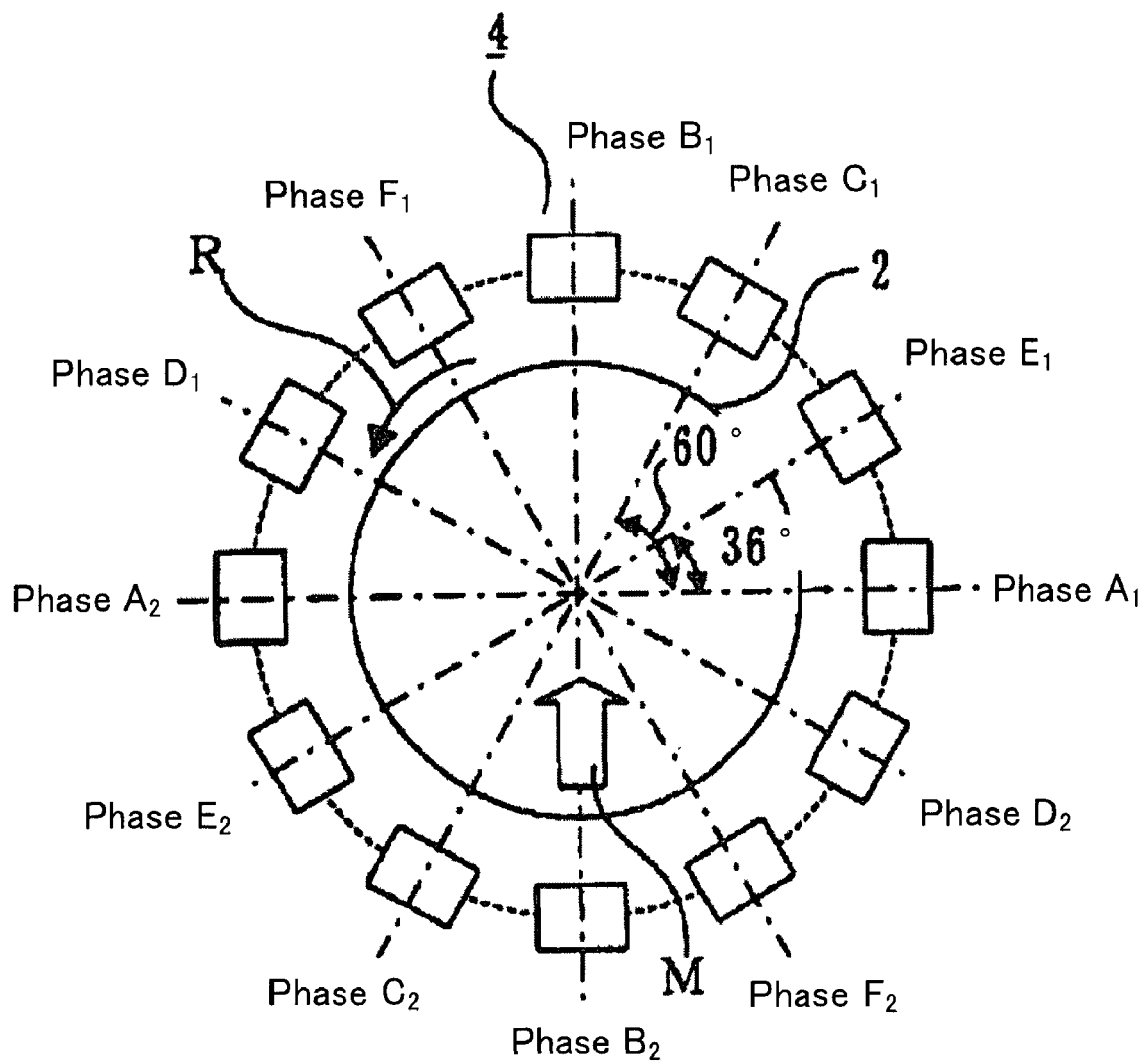
FIG. 7 is a structural view of a position signal detecting portion of a magnetic encoder according to a fourth embodiment of the present invention.

FIG. 7 is a structural view of a position signal detecting portion of a magnetic encoder according to a fourth embodiment of the present invention.

In this figure, four Hall sensors of phase $A_1$, phase $B_1$, phase $A_2$ and phase $B_2$ arranged sequentially 2 at intervals of 90 degrees, Hall sensors of phase $C_1$, phase $D_1$, phase $C_2$ and phase $D_2$ are arranged at positions respectively 60 degrees (corresponding to the case in which $\alpha$=180/N, N=3) away from the Hall sensors of phase $A_1$, phase $B_1$, phase $A_2$ and phase $B_2$, and Hall sensors of phase $E_1$, phase $F_1$, phase $E_2$ and phase $F_2$ are arranged at positions respectively 36 degrees (corresponding to the case in which $\alpha$=180/N, N=5) away from the Hall sensors of phase $A_1$, phase $B_1$, phase $A_2$ and phase $B_2$.

Figure 8:
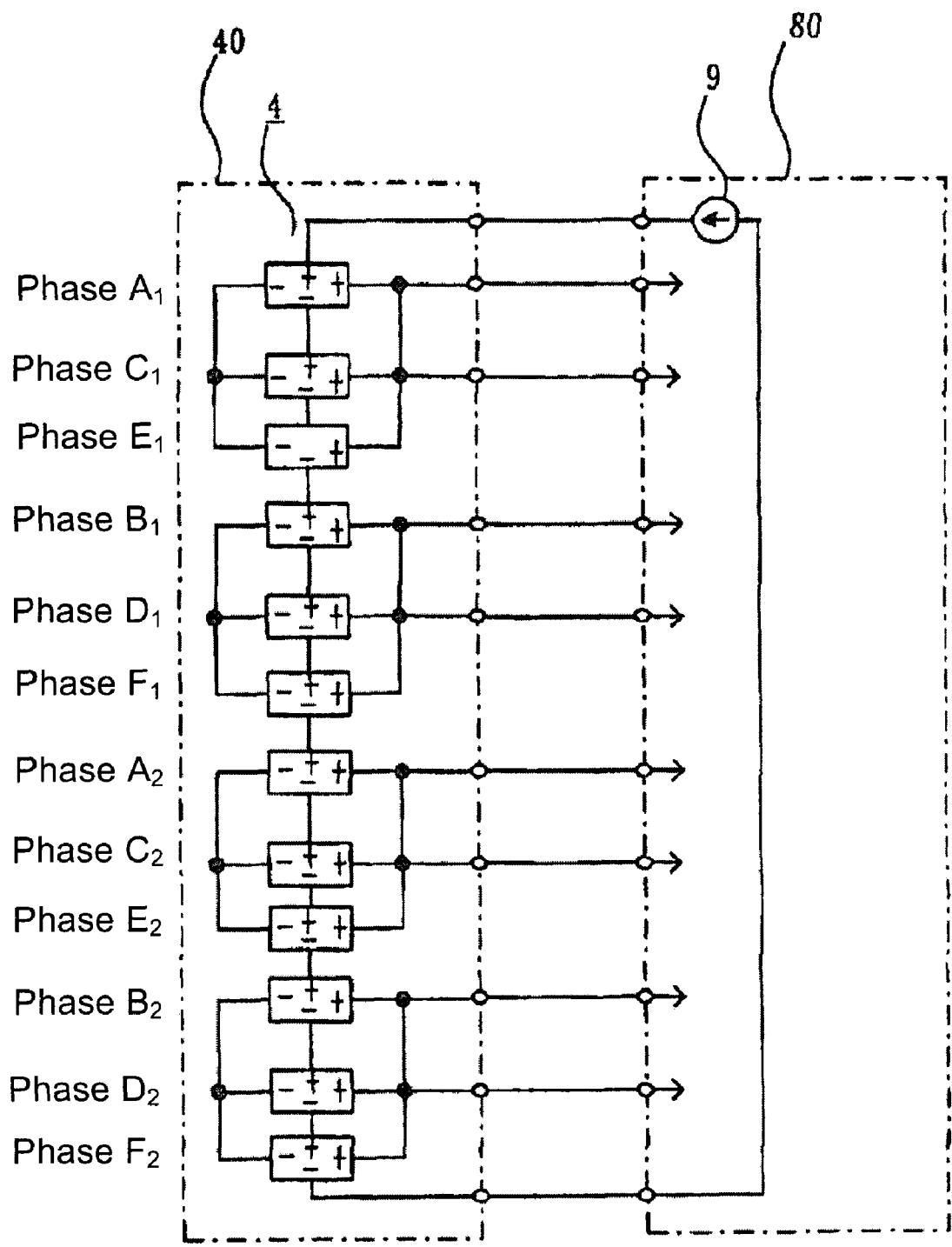
FIG. 8 is a connection diagram of Hall sensors of a magnetic encoder according to the fourth embodiment of the present invention.

FIG. 8 is a connection diagram of Hall sensors of a magnetic encoder according to this embodiment of the present invention.

In this figure, three Hall sensors of phase $A_1$, phase $C_1$ and phase $E_1$ form one group, and the output terminals of these three Hall sensors are connected in parallel such that the positive output terminals thereof are connected with each other and the negative output terminals thereof are connected with each other. As to the group consisting of the Hall sensors of phase $B_1$, phase $D_1$ and phase $F_1$, the group consisting of the Hall sensors of phase $A_2$, phase $C_2$ and phase $E_2$, and the group consisting of the Hall sensors of phase $B_2$, phase $D_2$ and phase $F_2$, they are connected in the same manner.

As explained above, in this embodiment, Hall sensors are arranged at positions 60 degrees away from the Hall sensors of phase $A_1$, phase $B_1$, phase $A_2$ and phase $B_2$ where the third-order harmonic components are cancelled and also at positions 36 degrees away from the Hall sensors of phase $A_1$, phase $B_1$, phase $A_2$ and phase $B_2$ where the fifth-order harmonic components are cancelled, so that the signals from the output terminals connected in parallel as mentioned above are taken out. Therefore, the third-order harmonic components and the fifth-order harmonic components can be eliminated.

The number of lead wires from the position signal detecting portion to the signal processing circuit can be reduced to ten in the same manner as in the first embodiment, the second embodiment and the third embodiment, which prevents deterioration of reliability and workability due to the increased number of Hall sensors.

In this embodiment, the output terminals of the three Hall sensors are connected in parallel. However, by connecting them in series, the outputs from the three Hall sensors will be vectorially synthesized, and therefore an output signal having a fundamental wave about 2.7 times larger than an output signal from a single Hall sensor can be obtained.

Accordingly, the S/N ratio can be improved, and a highly-reliable and high-precision magnetic encoder can be provided.

Embodiment 5

Figure 9:
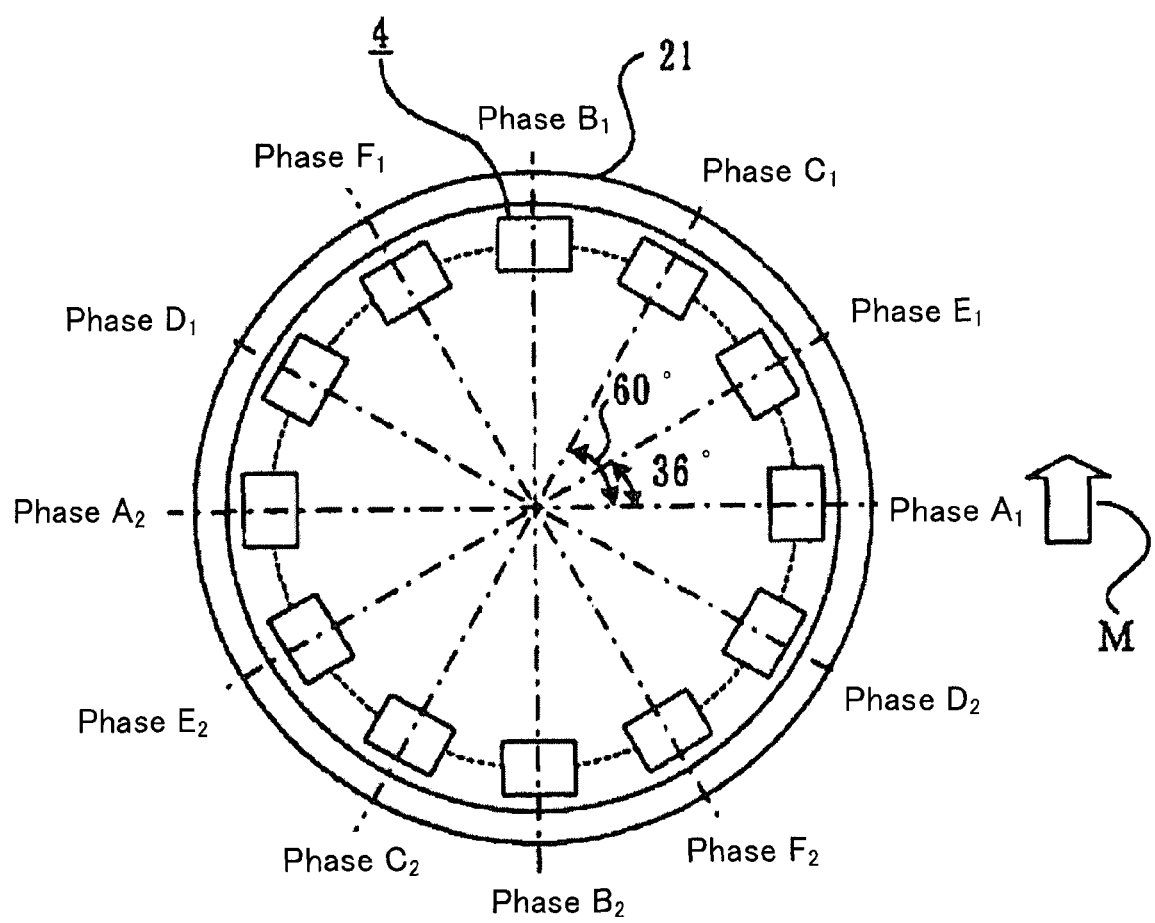
FIG. 9 is a structural view of a position signal detecting portion of a magnetic encoder according to a fifth embodiment of the present invention.
Figure 10A:
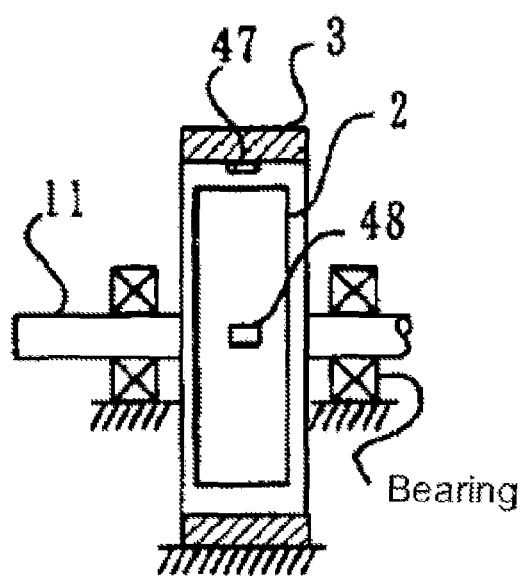
FIG. 10 is a structural view of a magnetic encoder according to a first prior art.
Figure 10B:
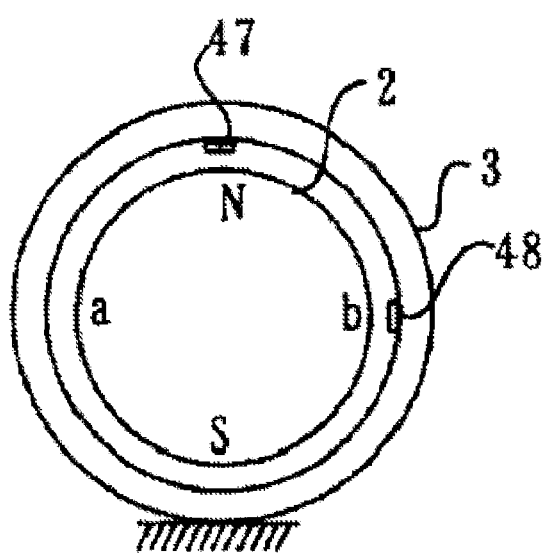
Figure 11:
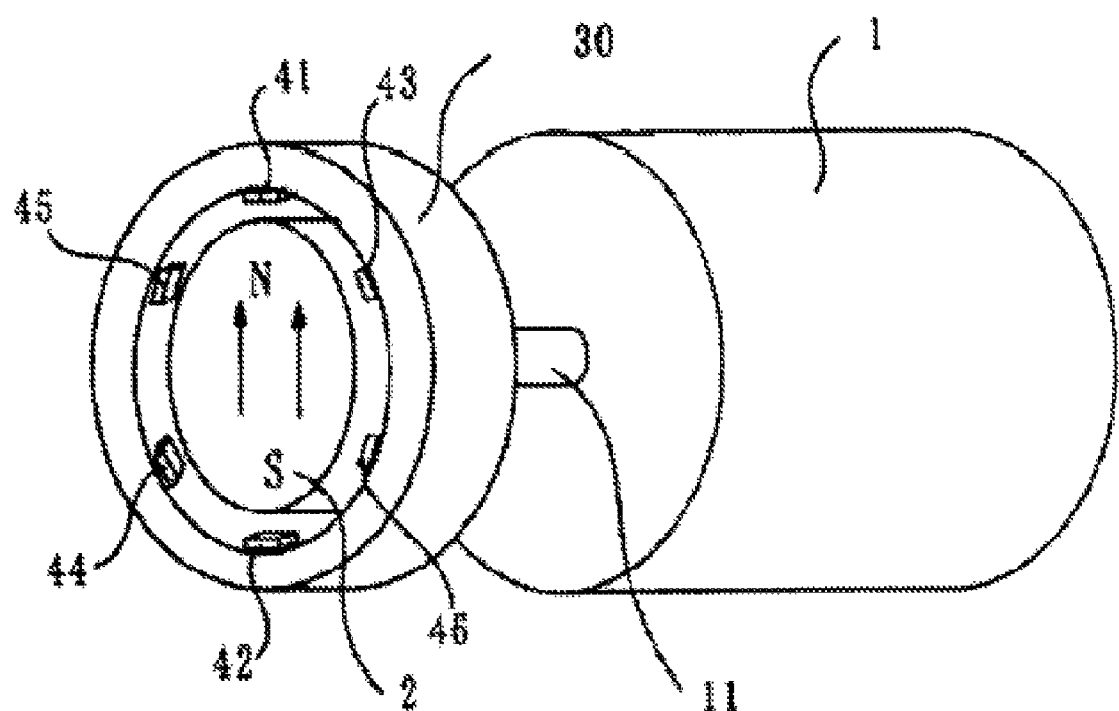
FIG. 11 is a structural view of a magnetic encoder according to a second prior art.
Figure 12:
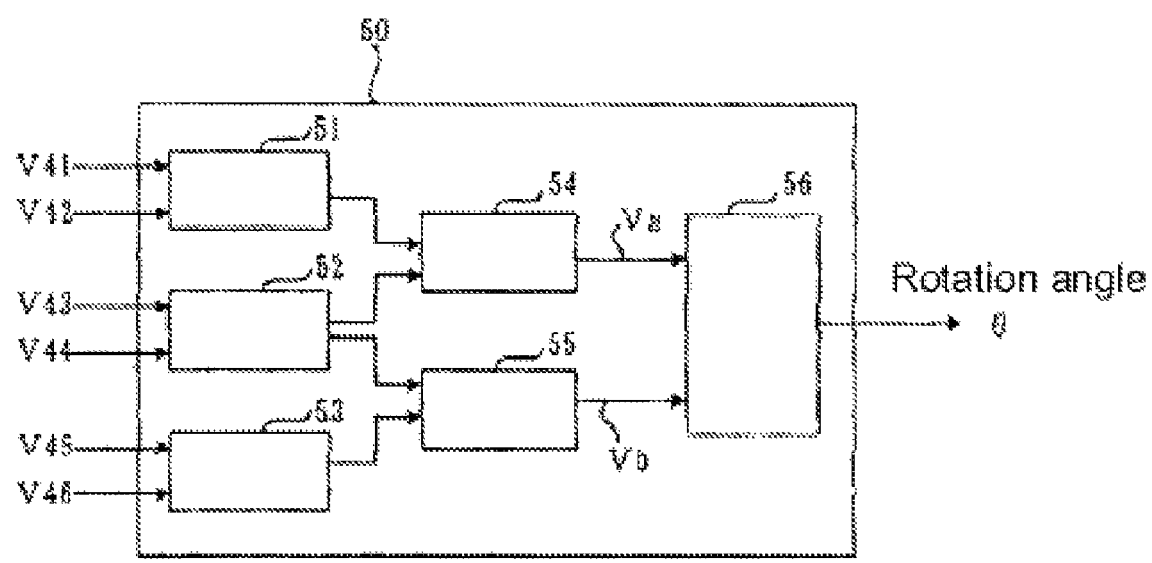
FIG. 12 is a block diagram of a signal processing circuit of the magnetic encoder according to the second prior art

FIG. 9 is a structural view of a position signal detecting portion of a magnetic encoder according to a fifth embodiment of the present invention.

In this figure, "21" denotes a ring-shaped permanent magnet attached to a rotor (not illustrated). The permanent magnet is magnetized in one direction perpendicular to the axial direction of the rotor as shown in the arrow M in this figure. "4" denotes a Hall sensor arranged on the inside of the ring-shaped permanent magnet 21 via a gap.

This embodiment is different from the third embodiment in that the permanent magnet 2 is a ring-shaped permanent magnet 21. With this structure, this encoder can be applied to an outer rotor type motor having a non-rotating hollow shaft.

INDUSTRIAL APPLICABILITY

The present invention can be applied to a magnetic encoder for detecting a rotational position of a servomotor for use in, e.g., a robot or a working machine.

What is claimed is:

1. A magnetic encoder equipped with a disc-shaped or ring-shaped permanent magnet attached to a rotor and magnetized in one direction perpendicular to an axial direction of the rotor, a magnetic field detecting element attached to a stator so as to face the permanent magnet via a gap, and a signal processing circuit for processing a signal from the magnetic field detecting element, characterized in that the magnetic field detecting element comprises Hall sensors of phase $A_1$, phase $B_1$, phase $A_2$ and phase $B_2$ sequentially arranged at intervals of 90 degrees and Hall sensors of phase $C_1$, phase $D_1$, phase $C_2$ and phase $D_2$ respectively arranged at positions $\alpha$ degrees away from the Hall sensors of phase $A_1$, phase $B_1$, phase $A_2$ and phase $B_2$, wherein $\alpha$=360/N or $\alpha$=180/N (N is an odd number of 3 or above), and output terminals of the Hall sensors of phase $A_1$, phase $B_1$, phase $A_2$ and phase $B_2$ and output terminals of Hall sensors of phase $C_1$, phase $D_1$, phase $C_2$ and phase $D_2$ are connected in parallel, respectively.

2. A magnetic encoder equipped with a disc-shaped or ring-shaped permanent magnet attached to a rotor and magnetized in one direction perpendicular to an axial direction of the rotor, a magnetic field detecting element attached to a stator so as to face the permanent magnet via a gap, and a signal processing circuit for processing a signal from the magnetic field detecting element, characterized in that the magnetic field detecting element comprises Hall sensors of phase $A_1$, phase $B_1$, phase $A_2$ and phase $B_2$ sequentially arranged at intervals of 90 degrees and Hall sensors of phase $C_1$, phase $D_1$, phase $C_2$ and phase $D_2$ respectively arranged at positions $\alpha$ degrees away from the Hall sensors of phase $A_1$, phase $B_1$, phase $A_2$ and phase $B_2$, wherein $\alpha$=360/N or $\alpha$=180/N (N is an odd number of 3 or above), and output terminals of the Hall sensors of phase $A_1$, phase $B_1$, phase $A_2$ and phase $B_2$ and output terminals of Hall sensors of phase $C_1$, phase $D_1$, phase $C_2$ and phase $D_2$ are connected in series, respectively.

3. The magnetic encoder as recited in claim 1 or 2, wherein the N is 3.

4. The magnetic encoder as recited in claim 1 or 2, wherein the N is 5.

5. A magnetic encoder equipped with a disc-shaped or ring-shaped permanent magnet attached to a rotor and magnetized in one direction perpendicular to an axial direction of the rotor, a magnetic field detecting element attached to a stator so as to face the permanent magnet via a gap, and a signal processing circuit for processing a signal from the magnetic field detecting element, characterized in that the magnetic field detecting element comprises Hall sensors of phase $A_1$, phase $B_1$, phase $A_2$ and phase $B_2$ sequentially arranged at intervals of 90 degrees and Hall sensors of phase $C_1$, phase $D_1$, phase $C_2$ and phase $D_2$ respectively arranged at positions $\alpha_1$ degrees away from the Hall sensors of phase $A_1$, phase $B_1$, phase $A_2$ and phase $B_2$, wherein $\alpha_1$ degrees=$360/N_1$ or $\alpha_1=180/N_1$ ($N_1$ is an odd number of 3 or above), and Hall sensors of phase $E_1$, phase $F_1$, phase $E_2$ and phase $F_2$ respectively arranged at positions $\alpha_2$ degrees away from the Hall sensors of phase $A_1$, phase $B_1$, phase $A_2$ and phase $B_2$, wherein $\alpha_2=360/N_7$ or $\alpha_2=180/N_2$ ($N_2$ is an odd number of 3 or above and different from the $N_1$), and Hall sensors of phase $E_1$, phase $F_1$, phase $E_2$ and phase $F_2$ arranged at positions $\alpha_2=360/N_2$ or $\alpha_2=180/N_2$ ($N_2$ is an odd number of 3 or above and different from the $N_1$) away from the Hall sensors of phase $A_1$, phase $B_1$, phase $A_2$ and phase $B_2$, and output terminals of the Hall sensors of $A_1$, phase $B_1$, phase $A_2$ and phase $B_2$, output terminals of Hall sensors of phase $C_1$, phase $D_1$, phase $C_2$ and phase $D_2$ and output terminals of Hall sensors of phase $E_1$, phase $F_1$, phase $E_2$ and phase $F_2$ are connected in parallel, respectively.

6. A magnetic encoder equipped with a disc-shaped or ring-shaped permanent magnet attached to a rotor and magnetized in one direction perpendicular to an axial direction of the rotor, a magnetic field detecting element attached to a stator so as to face the permanent magnet via a gap, and a signal processing circuit for processing a signal from the magnetic field detecting element, characterized in that the magnetic field detecting element comprises Hall sensors of phase $A_1$, phase $B_1$, phase $A_2$ and phase $B_2$ sequentially arranged at intervals of 90 degrees and Hall sensors of phase $C_1$, phase $D_1$, phase $C_2$ and phase $D_2$ respectively arranged at positions $\alpha_1$ degrees away from the Hall sensors of phase $A_1$, phase $B_1$, phase $A_2$ and phase $B_2$, wherein $\alpha_1$ degrees=$360/N_1$ or $\alpha_1=180/N_1$ ($N_1$ is an odd number of 3 or above), and Hall sensors of phase $E_1$, phase $F_1$, phase $E_2$ and phase $F_2$ respectively arranged at positions $\alpha_2$ degrees away from the Hall sensors of phase $A_1$, phase $B_1$, phase $A_2$ and phase $B_2$, wherein $\alpha_2=360/N_2$ or $\alpha_2=180/N_2$ ($N_2$ is an odd number of 3 or above and different from the $N_1$), and output terminals of the Hall sensors of phase $A_1$, phase $B_1$, phase $A_2$ and phase $B_2$, output terminals of Hall sensors of phase $C_1$, phase $D_1$, phase $C_2$ and phase $D_2$ and output terminals of Hall sensors of phase $E_1$, phase $F_1$, phase $E_2$ and phase $F_2$ are connected in series, respectively.

7. The magnetic encoder as recited in claim 5 or 6, wherein the $N_1$ is 3 and $N_2$ is 5.

* * * * *